(12) United States Patent
Scarpelli

(10) Patent No.: US 9,195,563 B2
(45) Date of Patent: Nov. 24, 2015

(54) USE OF METRICS SELECTED BASED ON LAG CORRELATION TO PROVIDE LEADING INDICATORS OF SERVICE PERFORMANCE DEGRADATION

(75) Inventor: Joseph A. Scarpelli, Half Moon Bay, CA (US)

(73) Assignee: BMC SOFTWARE, INC., Houston, TX (US)

( * ) Notice: Subject to any disclaimer, the term of this patent is extended or adjusted under 35 U.S.C. 154(b) by 906 days.

(21) Appl. No.: 13/433,678

(22) Filed: Mar. 29, 2012

(65) Prior Publication Data

US 2012/0254414 A1    Oct. 4, 2012

Related U.S. Application Data

(60) Provisional application No. 61/469,479, filed on Mar. 30, 2011.

(51) Int. Cl.
*G06F 15/16* (2006.01)
*G06F 11/34* (2006.01)

(52) U.S. Cl.
CPC ........ *G06F 11/3452* (2013.01); *G06F 11/3495* (2013.01); *G06F 11/3409* (2013.01); *G06F 11/3419* (2013.01); *G06F 2201/81* (2013.01); *G06F 2201/875* (2013.01)

(58) Field of Classification Search
CPC .............. G06F 15/173; G06F 11/3495; G06F 11/3452; G06F 11/3409; G06F 2201/875; G06F 2201/81; G06F 11/3419
USPC .......................................................... 709/224
See application file for complete search history.

(56) References Cited

U.S. PATENT DOCUMENTS

| | | | |
|---|---|---|---|
| 7,451,210 B2 * | 11/2008 | Gupta et al. ................... | 709/224 |
| 7,516,438 B1 * | 4/2009 | Leonard et al. ................ | 717/102 |
| 8,015,454 B1 * | 9/2011 | Harrison et al. .............. | 714/47.3 |
| 8,069,231 B2 * | 11/2011 | Schran et al. .................. | 709/221 |
| 8,327,335 B2 * | 12/2012 | Noble et al. ................... | 717/127 |
| 8,438,275 B1 * | 5/2013 | Brooker ......................... | 709/224 |
| 8,966,036 B1 * | 2/2015 | Asgekar et al. ................ | 709/223 |
| 2003/0074161 A1 * | 4/2003 | Smocha et al. ................ | 702/186 |
| 2003/0126254 A1 * | 7/2003 | Cruickshank et al. ........ | 709/224 |
| 2003/0126256 A1 * | 7/2003 | Cruickshank et al. ........ | 709/224 |
| 2005/0132371 A1 * | 6/2005 | Lopez-Estrada .............. | 718/100 |
| 2005/0262237 A1 * | 11/2005 | Fulton et al. .................. | 709/224 |
| 2006/0161648 A1 * | 7/2006 | Ding et al. .................... | 709/224 |
| 2006/0184564 A1 * | 8/2006 | Castellanos et al. .......... | 707/102 |
| 2007/0027985 A1 * | 2/2007 | Ramany et al. ............... | 709/224 |

(Continued)

*Primary Examiner* — Anthony Mejia
(74) *Attorney, Agent, or Firm* — Brake Hughes Bellermann LLP

(57) ABSTRACT

The present description refers to a computer implemented method, computer program product, and computer system for identifying a service metric associated with a service, identifying one or more abnormalities of one or more infrastructure metrics that occur within a time window around an abnormality of the service metric, determining a set of candidate infrastructure metrics for the service metric based on how many times an abnormality of an infrastructure metric occurred within a time window around an abnormality of the service metric, determining a degree of lag correlation for each candidate infrastructure metric with respect to the service metric, selecting one or more candidate infrastructure metrics having a degree of lag correlation that exceeds a threshold to be a leading indicator infrastructure metric for the service metric, and providing a performance degradation warning for the service when an abnormality of one of the leading indicator infrastructure metrics is detected.

17 Claims, 11 Drawing Sheets

(56) References Cited

U.S. PATENT DOCUMENTS

| | | | |
|---|---|---|---|
| 2008/0320123 A1* | 12/2008 | Houlihan et al. | 709/224 |
| 2009/0157674 A1* | 6/2009 | Curry | 707/6 |
| 2010/0191851 A1* | 7/2010 | Raja et al. | 709/224 |
| 2011/0153810 A1* | 6/2011 | Raja et al. | 709/224 |
| 2012/0054331 A1* | 3/2012 | Dagan | 709/224 |
| 2012/0197626 A1* | 8/2012 | Kejariwal et al. | 703/22 |
| 2012/0254414 A1* | 10/2012 | Scarpelli | 709/224 |
| 2013/0151691 A1* | 6/2013 | Etgen et al. | 709/224 |

\* cited by examiner

USE OF METRICS SELECTED BASED ON LAG CORRELATION TO PROVIDE LEADING INDICATORS OF SERVICE PERFORMANCE DEGRADATION

CROSS-REFERENCE TO RELATED APPLICATIONS

This application claims priority to U.S. provisional application Ser. No. 61/469,479, filed on Mar. 30, 2011, entitled "Auto-Detecting Leading Indicators to Service Degradation," which is hereby incorporated by reference.

TECHNICAL FIELD

This description is directed generally to service performance degradations, and in particular, to a computer-implemented method, apparatus, and computer program product for use of metrics based on lag correlation to provide leading indicators of service performance degradation.

BACKGROUND

As Information Technology (IT) groups have become more service-centric, the focus on service or business metrics has increased with one goal to be able to minimize or decrease service level violations or service performance degradations. Some IT administrators seek to isolate and solve problems that cause service performance degradation. A challenge to IT operators/administrators is that there are typically a large number of metrics being collected, some of which may reflect health or performance of a system. Typically, an administrator may set thresholds and/or establish rules in attempt to use the metrics to provide hints as to system performance degradation.

SUMMARY

In one general aspect, a computer program product is provided. The computer program product is tangibly embodied on a computer-readable storage medium and includes executable code that, when executed, is configured to cause at least one data processing apparatus to identify a service metric associated with a service, identify one or more abnormalities of one or more infrastructure metrics that occur within a time window around an abnormality of the service metric, determine a set of candidate infrastructure metrics for the service metric based on how many times an abnormality of an infrastructure metric occurred within a time window around an abnormality of the service metric, determine a degree of lag correlation for each candidate infrastructure metric with respect to the service metric, selecting one or more candidate infrastructure metrics having a degree of lag correlation that exceeds a threshold to be a leading indicator infrastructure metric for the service metric, and provide a performance degradation warning for the service when an abnormality of one of the leading indicator infrastructure metrics is detected.

In another general aspect, a computer implemented method is provided that includes identifying a service metric associated with a service, identifying one or more abnormalities of one or more infrastructure metrics that occur within a time window around an abnormality of the service metric, determining a set of candidate infrastructure metrics for the service metric based on how many times an abnormality of an infrastructure metric occurred within a time window around an abnormality of the service metric, determining a degree of lag correlation for each candidate infrastructure metric with respect to the service metric, selecting one or more candidate infrastructure metrics having a degree of lag correlation that exceeds a threshold to be a leading indicator infrastructure metric for the service metric, and providing a performance degradation warning for the service when an abnormality of one of the leading indicator infrastructure metrics is detected.

In another general aspect, an apparatus includes service metric identification logic configured to identify a service metric associated with a service, abnormality identification logic configured to identify one or more abnormalities of one or more infrastructure metrics that occur within a time window around an abnormality of the service metric, determining logic configured to determine a set of candidate infrastructure metrics for the service metric based on how many times an abnormality of an infrastructure metric occurred within a time window around an abnormality of the service metric, the determining logic configured to determine a degree of lag correlation for each candidate infrastructure metric with respect to the service metric, selecting logic configured to select one or more candidate infrastructure metrics having a degree of lag correlation that exceeds a threshold to be a leading indicator infrastructure metric for the service metric, and warning providing logic configured to provide a performance degradation warning for the service when an abnormality of one of the leading indicator infrastructure metrics is detected.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
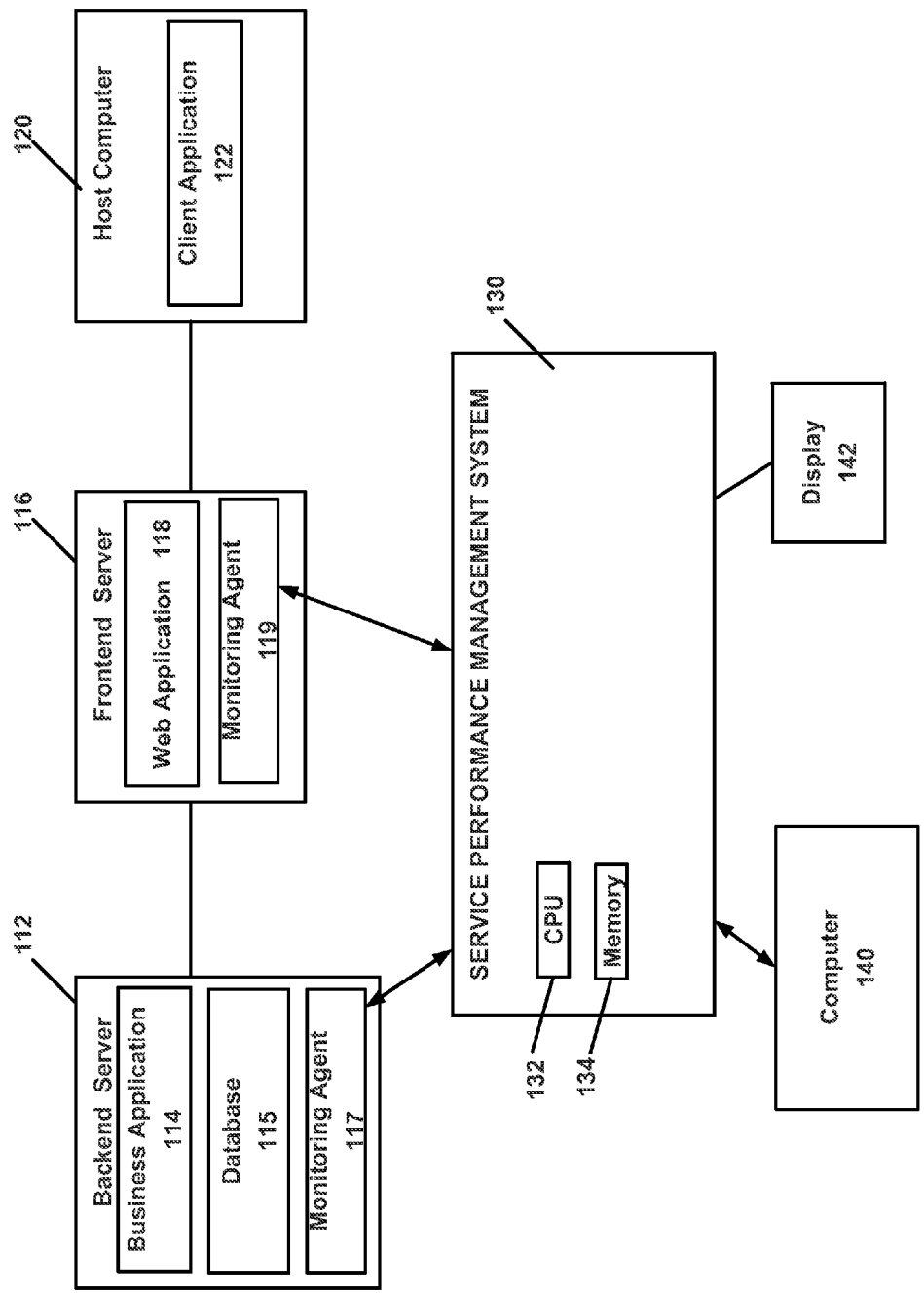
FIG. 1 is a block diagram of a system according to an example implementation.

FIG. 1 is a block diagram of a system according to an example implementation. System 110 may include a backend server 112, a frontend server 116, and a host computer 120, where frontend server 116 is in communication with host computer 120 and backend server 112 via one or more networks, e.g., Internet, LAN (local area network), and/or wireless network, or other network. Although not shown, backend server 112, frontend server 116 and host computer 120 may include a processor or CPU, memory (e.g., Random Access Memory), a hard drive, one or more network interfaces, and may also input/output devices (display, mouse, keyboard, pointing device, etc.) coupled to each server or computer.

Backend server 112 may include a business application 114 for processing data. Backend server 112 also includes a database 115 or other data structure for storing data.

Frontend server 116 may communicate with backend server 112 and/or business application 114. Frontend server 116 may include an application, such as Web application 118, for providing a service to client application 122 running on host computer 120. Application 118 may provide any type of service to one or more client applications, such as for client application 122. As part of the service provided by application 118, application 118 may receive a request from client application, such as a read or write request. In response to receiving such request, application 118 may access database 115, e.g., to perform reads from and/or writes to database 115 in order to fulfill the request from client application 118. Therefore, in this example, processing may be performed at both frontend server 116 and backend server 112 for application 118 to provide the requested service to client application 122.

Backend server 112 may include a monitoring agent 117, and frontend server 116 may include a monitoring agent 119. Monitoring agents 117 and 119 may monitor (e.g., measure or detect) one or more metrics for servers 112 and 116, respectively. A metric may include any type of measurement that may be used to gauge the performance of any item, such as to gauge or measure the performance of a system, a component, a service, or software, for example.

According to an example implementation, monitoring agent 119 may monitor or measure a service metric that may be used to gauge the performance of a service provided by an application or system, such as, for example, the service offered by web application 118 to client application 122. For example, one illustrative service metric may include an application response time or service response time. For example, the application response time may identify the amount of time from when client 122 submits a request (e.g., to read or write information) to Web application 118 until the time that client application 122 receives a response. This is merely one example of a service metric, and other service metrics may be used.

A variety of services may be measured, based on measuring one or more service metrics. Other service metrics that may be measured may include, for example: connect time (ms) (e.g., the amount of time it takes to make a connection between two applications); first byte download time (ms) (e.g., the amount of time until the first byte is downloaded after submitting a request); DNS (Domain Name System) lookup time (e.g., the amount of time it takes for a DNS server to receive a lookup request and return a reply); availability (%); total bytes (KB) (e.g., the total number of bytes of data transmitted and/or received by an application or for the service); checksum match (%) (e.g., the percentage of packets where the checksum matches, indicating no errors for the packet). A service metric (or service performance metric) may also include a synthetic transaction which is replayed and measured (by whatever metric or metrics are deemed relevant), or a real-user transaction measured passively, as examples.

Monitoring agents 117 and 119 may also monitor or measure one or more infrastructure metrics. An infrastructure metric may include a measurement that may be used to gauge or measure (or which may reflect) a performance of any component, system or software that underlies or supports, or is used by, the service or application that provides the service. Some example service metrics may include: total CPU utilization (%); system CPU utilization (%); user CPU utilization (%); memory utilization (%); context switches (# per sec.); swap space used (%); interrupts (# per sec.) number of processes (#); processor queue length (#); database (DB) response time (ms); application queue length; number of jobs; or, any system or network or application infrastructure-related data. These are merely some examples, and other infrastructure metrics may be used.

According to an example implementation, techniques described herein may be used to learn or determine which infrastructure metrics are leading indicators to service performance degradations of a service, and automatically applying this information in the future so as to give information technology (IT) operators/administrators and/or other users an early warning of a pending service performance degradation based on an abnormality of the leading indicator infrastructure metric. For example, since leading indicator infrastructure metrics may be determined based on a calculation of a correlation coefficient with respect to the service metric, the generation of a service performance degradation warning may be generated automatically without an administrator/operator inputting domain rules about specific metrics, which may reduce false early warnings.

As shown in FIG. 1, monitoring agents 117 and 119 may measure and report various service metrics and infrastructure metrics to a service performance management system 130. These metrics may be measured and reported at various intervals, or at periodic intervals, such as every minute, every second, every 3 seconds, etc. Service performance management system may include a CPU 132 or processor, memory 134 for storing data, and software or code stored in memory 134 and/or on a hard drive.

Based on the received metrics information, service performance management system 130 may identify one or more abnormalities of service metrics and infrastructure metrics. System 130 may determine a set of candidate infrastructure metrics for the service metric, e.g., as a subset of the infrastructure metrics. System 130 may determine a degree of lag correlation between each of the candidate infrastructure metrics with respect to the service metric.

One or more infrastructure metrics may be selected, based on the infrastructure metric's degree of lag correlation (e.g., correlation coefficient), to be a leading indicator infrastructure metric for the service. In an example implementation, due to the lag correlation between each leading indicator infrastructure metric and a system metric, system 130 may send or provide a service performance degradation warning to a computer 140 or display 142 (or other computer or node) when an abnormality of one of the leading indicator infrastructure metrics is detected by system 130. Therefore, due to the significant correlation between the leading indicator infrastructure metric and the system metric, the occurrence of an abnormality of the leading indicator infrastructure metric may be used to provide an early warning of an expected abnormality of the service metric, which may indicate an expected performance degradation of the service associated with the service metric. Further details are described below.

Figure 2:
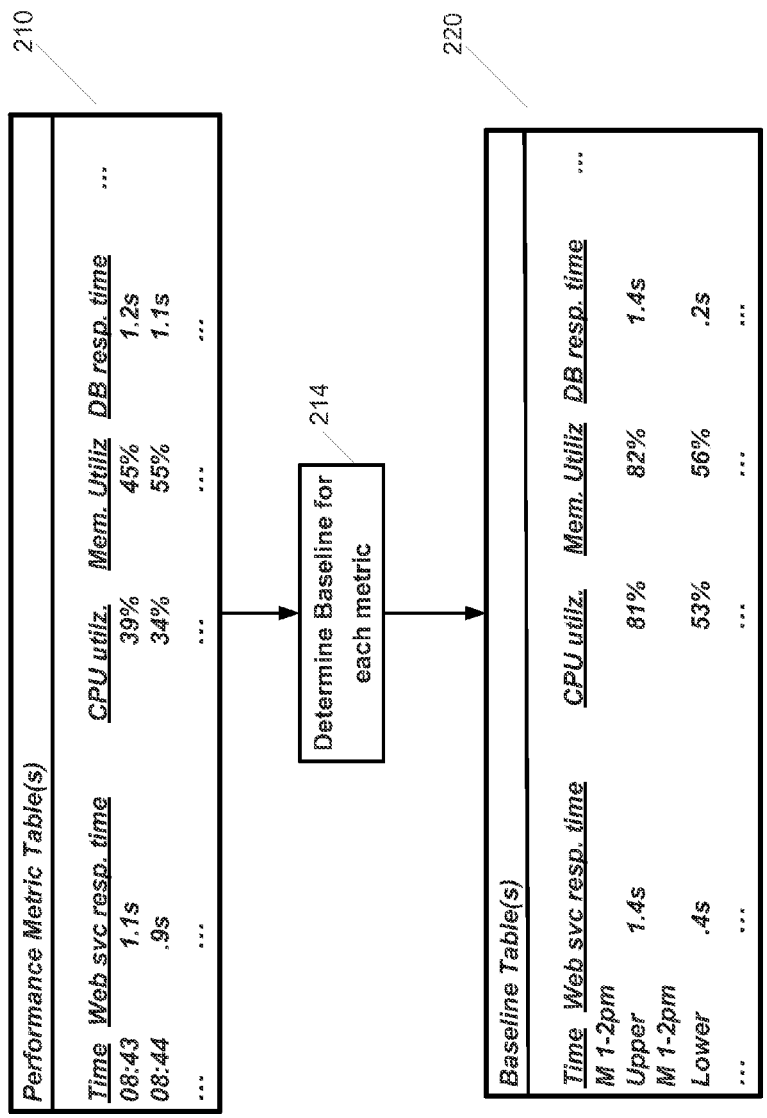
FIG. 2 is a block diagram illustrating a performance metric table and a baseline table according to example implementations.

FIG. 2 is a block diagram illustrating a performance metric table and a baseline table according to example implementations. System 130 may receive performance metric data from monitoring agents 117 and 119 (FIG. 1) that includes periodic or frequent (e.g., every second, every 10 seconds, or every minute) measurements for various service metrics and infrastructure metrics. Based on the performance metric data received from monitors 117 and 119, system 130 builds a performance metric table 210 which may identify a time or timestamp for the metric data and the metric data for each of the metrics. As shown in FIG. 2, this example performance metric table 210 includes metric data or measured metric values for several metrics, such as several metric values measured or time-stamped at 08:43, including: a 1.1 second value for a web services response time, a 78% value for CPU utilization, a 79% value for memory utilization, and a 1.4 second value for a database response time. The Web services response time may be considered a service metric, while the other metric values may be infrastructure metric values on which the web services response time may rely upon or may depend upon, or where some dependency relationship (between the service metric and each of the infrastructure metric) may exist. Other metric values are also shown for time 08:44. The performance metric table 210 may be one table or may be multiple tables, such as one table for each metric. Although not shown, performance metric table 210 may also include additional identifier information for each metric value, such as an identifier that identifies a computer (e.g., computer name or MAC address), a server (server name or identifier), a database name or identifier, or a CPU identifier, for example, from which the metric value was measured.

An abnormality in a service metric or infrastructure metric may be detected based on use of a threshold value, or based on the use of a baseline. An abnormal value of a metric may be a value that is, for example, outside of a threshold or outside of a baseline for the metric. According to an example implementation, baseline values may be used for each metric to allow for the identification of future metric values that may be considered to be abnormal or outside of the baseline.

In an example implementation. A baseline may include an upper value (or upper baseline value) and a lower value (or lower baseline value), e.g., an upper value and a lower value for the baseline for each time period or each sample period, for example. Thus, a baseline may be updated, or recalculated each hour (or other time period) for each metric.

In an example implementation, system 130 may determine a baseline for each metric at block 214 based upon metric values received and stored in the performance metric table 210. Many different techniques may be used to determine a baseline for each metric. One example technique will now be briefly described for determining the baseline, which includes a baseline upper value and a baseline lower value.

In an example implementation, 60 data points (or metric values) may be collected for a metric, e.g., with one metric value or data point collected each minute for a metric as shown by performance metric table 210, as an example. Thus, for a previous hour or previous 60 minutes, there will be 60 metric values collected or received for each metric, with one metric value measured and collected per minute. A new baseline may be calculated for each metric value each hour based on a new set of collected 60 data points or 60 metric values received from monitoring agents 117 and 119 over the past 60 minutes, for example.

As an example, the following procedure may be used to determine a baseline. In an example implementation, the 60 metric values for the previous hour may be ranked from highest value to lowest value, and the top 10% (top 6 values) of these values and the lowest 10% (lowest 6 values) of these values will be discarded, leaving a remaining 48 metric values, e.g., which may be the middle 80% of these measured metric values. These remaining 48 measured metric values are still ranked from highest to lowest. In this example, the highest remaining metric value may be used as the baseline upper value, and the lowest remaining metric value may be used as the baseline lower value. Therefore the baseline in this example includes a baseline upper value and a baseline lower value that identifies the upper and lower points for the middle 80% range of the measured metric values measured over the last sampling period (over last 60 minutes in this example). The use of 60 samples and the use of 80% are merely provided as an example, and other values and other baseline calculation techniques may be used. For example, a baseline may be recalculated every two hours, and may use 90% instead of 80%.

In an example variation of this technique to determine a baseline, the new calculated baseline upper value may be averaged with a previous hour's baseline upper value to obtain the new baseline upper value, in order to provide a smoothing between baseline values. Similarly, the new calculated baseline lower value may be averaged with a previous hour's baseline lower value to obtain the new baseline lower value. During the next hour, for example, a metric value that exceeds (or is greater than) its baseline upper value, or falls below (or is less than) its baseline lower value may be considered to be an abnormality or an abnormal metric value.

As shown in FIG. 2, system 130 generates a baseline table 220 that includes the baseline upper value and baseline lower value for each of the metrics. He baseline upper and lower values may be provided for each time. According to one example implementation. For example baseline table 220 may include a baseline upper value and a baseline lower value for each metric for each hour of the day for each day of the week. For example, as shown in FIG. 2, baseline upper values and baseline upper lower values are shown for Monday 1-2 pm, which include: baseline upper values, including 1.4 seconds for web service response time, 81% for CPU utilization, 82% for memory utilization, and 1.4 seconds for database response time, as baseline upper values for Monday, 1-2 pm. Baseline lower values are shown in table 220, for the period Monday, 1-2 pm, including 0.4 seconds for the web service response time, 53% for CPU utilization, 56% for memory utilization, and 0.2 seconds for database response time. These baseline upper values and baseline lower values are merely examples and other values may be used.

Figure 3:
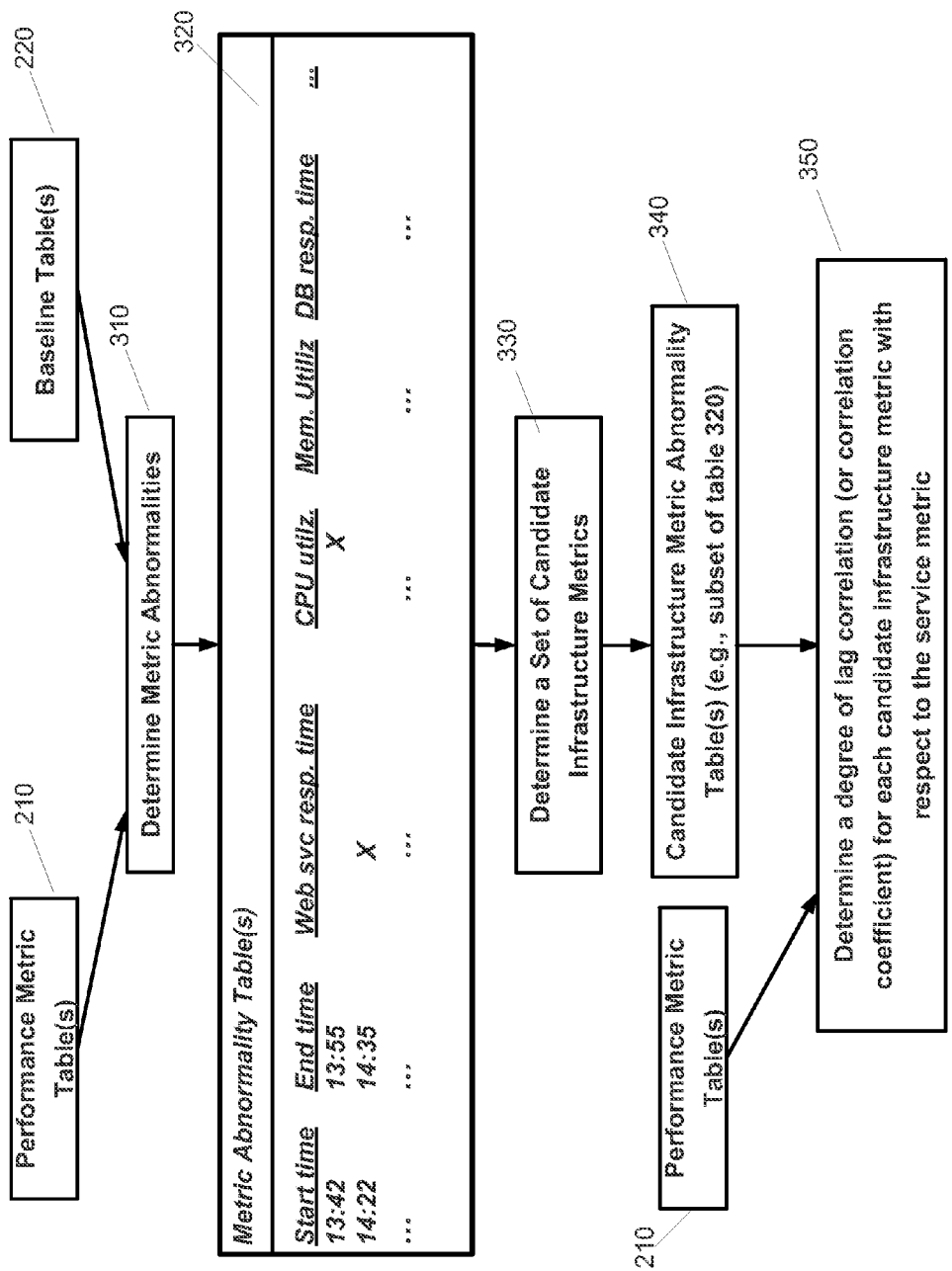
FIG. 3 is a block diagram illustrating a metric abnormality table and a determination of a lag correlation for each metric according to an example implementation.

FIG. 3 is a block diagram illustrating a metric abnormality table and a determination of a lag correlation for each metric according to an example implementation. As shown in FIG. 3, system 130 may determine or identify one or more metric abnormalities at block 310 based on the performance metric table 210 and the baseline table 220. According to an example implementation, system 130 may compare each metric value to the baseline upper and lower values for that time period to determine if the measured metric value is either above the baseline upper value or below the baseline lower value. If a metric value is above its associated baseline upper value or below the baseline lower value, this indicates an abnormality for the measured metric value. For example, as shown in FIG. 2, if a web services response time of 1.1 seconds is greater than the baseline upper value of 1.0 s (as an example), this indicates that the 1.1 second web service response time is abnormal (as compared to the baseline for this time period).

As shown in FIG. 3, system 130 may generate a metric abnormality table 320 which may identify, for example, the time periods during which each metric was measured as an abnormal value. For example, CPU utilization was measured as an abnormal value from 13:42 until 13:55. Similarly, Web services response time was measured as an abnormal value from 14:22 until 14:35. Metric abnormality table 320 may identify other time periods during which other metrics were measured as abnormal values. Although not shown, metric abnormality table 320 may include or identify other information, such as the specific values that were abnormal for each metric.

At block 330, system 130 may determine a set of candidate infrastructure metrics for each service metric. A number of different techniques may be used to determine a set of candidate infrastructure metrics. According to one example implementation, system 130 may determine a set of candidate infrastructure metrics for a service metric based on how many times an abnormality of an infrastructure metric occurred within a time window around and abnormality of the service metric.

For example, a time window may be selected, e.g., 2 hours before until 2 hours after occurrence of a service metric abnormality. Or, in another example implementation, the time window may only include a time period before or preceding a service metric abnormality (e.g., one hour before the service metric abnormality). System 130 may identify the infrastructure metrics that occur within the time window around each occurrence of the service metric abnormality. System 130 may count the number of infrastructure metric abnormalities that occur (for each infrastructure metric) within the time window of the service metric abnormality, over a specific period of time, e.g., over a one-week period, or over the past 24 hours, or other period. System 130 may select a candidate set of infrastructure metrics to include those infrastructure metrics that had the most number of abnormalities within the time window around the service metric abnormalities, within that time period (e.g., one week, past 24 hours or other period). Or, a threshold may be used, where a set of candidate infrastructure metrics may be selected to include infrastructure metrics that included a minimum number (e.g., greater than the threshold) of abnormalities within such time window around (e.g., 1 hour before) each abnormality of the service metric.

In this manner, a candidate set of infrastructure metrics are identified to include a reduced set of infrastructure metrics that are the most promising since they have abnormalities that have occurred, e.g., the most, within the time window around any service metric abnormalities. This may be repeated for each service metric, e.g., a candidate set of infrastructure metrics may be selected for each service metric. Because performing correlation can be computationally expensive, determining a candidate set of infrastructure metrics may be done to decrease the number of infrastructure metrics on which correlation with the service metric will be performed, for example. In this manner, by obtaining a candidate set of infrastructure metrics, correlation may be performed between the service metric and only a subset of the infrastructure metrics in order to reduce the computational workload and complexity for performing correlations.

At block 350, system 130 determines a degree of lag correlation (or correlation coefficient) for one or more of the candidate infrastructure metrics with respect to the service metric. In one example implementation, a degree of lag correlation may be performed by calculating a Pearson's correlation coefficient for a set of candidate infrastructure metric values with respect to a set of service metric values.

A number of different techniques may be used to calculate a degree of correlation or correlation coefficient. One example technique is to calculate the correlation coefficient as the Pearson product-moment correlation coefficient, based on the equation 1 below, as an example:

$$r = \frac{1}{n-1} \sum \left(\frac{x-\bar{x}}{S_x}\right)\left(\frac{y-\bar{y}}{S_y}\right) \qquad \text{Eqn. 1}$$

The Pearson product-moment correlation coefficient (which may be simply referred to as the correlation coefficient) may be calculated by taking the ratio of the sample covariance of the two variables (two sets of metric values) to the product of the two standard deviations, summed over all metric values/samples, where x bar and y bar are the means of the two sets of metric values, $S_x$ and $S_y$ are standard deviations of the two sets of metric values, and x and y are the metric values.

In one example implementation, a degree of lag correlation may be performed by calculating a Pearson's correlation coefficient for a set of candidate infrastructure metric values with respect to a set of service metric values, where one of the sets of values is lagged by a lag amount (shifting one of the sets of values/data a certain amount of time, either forward or backward, before performing the correlation). System 130 may shift one of the sets of values/data a certain amount of time, either forward or backward, and then perform the correlation.

For example, system 130 may collect a set of (e.g., 120) data points/values (e.g., one value per minute for two hours) for each candidate infrastructure metric, e.g., based on data values stored in performance metric table(s) 210, and may collect a set (e.g., 120) of data points/values for the system metric for the same time period. The infrastructure metric values may, for example, be shifted forward by 15 minutes, 30 minutes, 45 minutes, an hour, or other time period, and then a degree of lag correlation, which may also be referred to as a correlation coefficient, which, for example, may be calculated using the Pearson product moment method. The degree of lag correlation or correlation coefficient may be determined based on the lagged infrastructure metric values and the service metric values. Alternatively, the service metric values may be lagged backward, for example, by 15 minutes, 30 minutes, 45 minutes, 1 hour, or other time period, and then a correlation coefficient or degree of correlation may be calculated for each of the infrastructure metrics with respect to the lagged service metric values, in order to generate a degree of correlation or correlation coefficient for each infrastructure metric with respect to the service metric.

In an example implementation, a correlation coefficient may be calculated for an infrastructure metric for each of a plurality of lag amounts, e.g., lag amounts of 5 minutes, 10, minutes, 15 minutes, 20 minutes, 25 minutes, . . . 60 minutes, as an example. The group of calculated correlation coefficients for an infrastructure metrics for the different lag amounts maybe compared to each other in order to identify the maximum correlation coefficient. The maximum correlation coefficient and the associated lag amount for an infrastructure metric may be selected as the correlation coefficient for an infrastructure metric with respect to a service metric, and may be recorded or stored in a table.

System 130 may select one or more candidate infrastructure metrics that have a degree of lag correlation that exceeds a threshold (e.g., a correlation coefficient of 0.6 or greater, for example) to be a leading indicator infrastructure metric for the service metric. In this manner, the leading indicator infrastructure metric may be used to provide early warning of an expected abnormalities of the service metric (or performance degradation of the service) when an abnormality is detected in the leading indicator infrastructure metric. Thus, according to an example implementation, system 130 may generate and provide a performance degradation warning for the service when an abnormality of one of the leading indicator infrastructure metrics is detected. According to an example implementation, leading indicator infrastructure metrics may be automatically selected to include those infrastructure metrics having a significant correlation (e.g., correlation coefficient greater than a threshold) with the service metric. In this manner, manual selection of an infrastructure metrics and manual generation of rules to interpret such metrics may be avoided or at least reduced. Rather, according to an example implementation, the techniques described herein may use the determination of a correlation coefficient for each infrastructure metric in order to determine those infrastructure metrics that should be used as leading indicator infrastructure metrics to provide performance degradation warnings for the service.

A correlation coefficient (or degree of correlation) for each candidate infrastructure metric may be calculated periodically (e.g., every hour, every 3 hours, every 24 hours, or other period), or at specific intervals, in order to keep the correlation coefficients up to date. For example, a correlation coefficient may be calculated for a candidate infrastructure metric with respect to the service metric based on a set of 60 data values collected for the previous hour, for each of the infrastructure metric and the service metric. This is merely an example, and the number of values or time period may vary.

Based on these updated correlation coefficients, the list of leading indicator infrastructure metrics may change, e.g., one or more infrastructure metrics maybe added to the list of leading indicator infrastructure metrics (e.g., if a metric's correlation coefficient is now greater than a threshold value), and one or more infrastructure metrics may be dropped from the list of leading indicator infrastructure metrics (e.g., if the metric's correlation coefficient is now less than the threshold). A smoothing function may also be used, where an updated (or new) correlation coefficient for a candidate infrastructure metric may be determined as a new calculated (e.g., most recently calculated) correlation coefficient averaged with the previous correlation coefficient (or averaged with one or more previous correlation coefficients) for the service metric.

According to one example implementation, the calculation of a correlation coefficient for each of one or more candidate infrastructure metrics with respect to a service metric may be triggered when an abnormality is detected in the candidate infrastructure metric and/or the service metric. For example, in one example implementation, a correlation coefficient may be determined/calculated for an candidate infrastructure metric at least over a time period from where the infrastructure metric crosses the baseline (or becomes abnormal), e.g., exceeds the upper baseline value or drops below the lower baseline value, through at least where the service metric crosses its baseline (abnormal service metric), or for a default time period if the service metric does not exceed its baseline within a reasonable period of time after the infrastructure metric crosses its baseline. Therefore, any abnormal values in the infrastructure metric or service metric may drive or trigger the calculation of a correlation coefficient, since, for example, this time period (from an infrastructure metric abnormality through at least the service metric abnormality) is when the metrics may change significantly. Thus, determining a correlation between the infrastructure metric and service metric during the time period may provide very useful correlation information upon leading indicator infrastructure metrics may be identified (e.g., if their degree of correlation or correlation coefficient exceeds a threshold).

Figure 4:
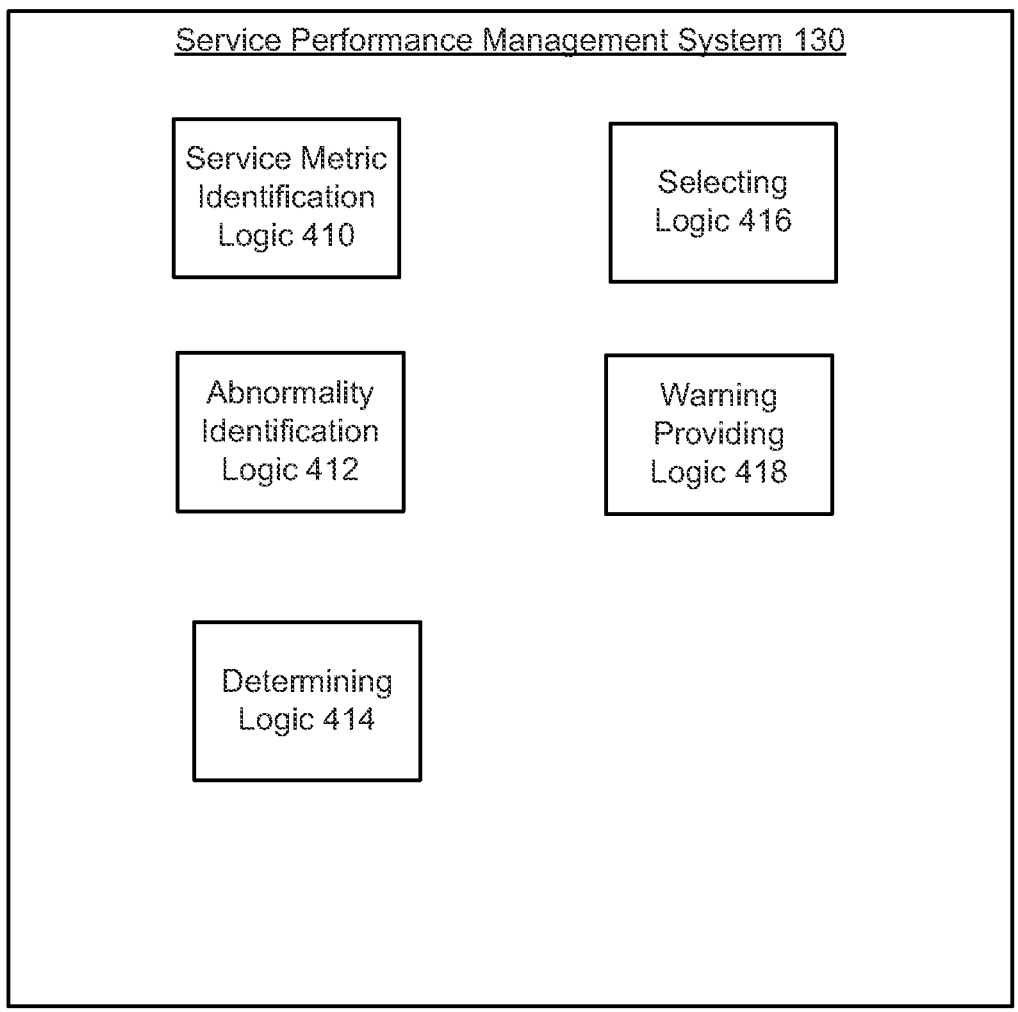
FIG. 4 is a block diagram illustrating a service performance management system according to an example implementation.

FIG. 4 is a block diagram illustrating a service performance management system according to an example implementation. Service performance management system 130 includes a service metric identification logic 410 configured to identify a service metric associated with a service, abnormality identification logic 412 configured to identify one or more abnormalities of one or more infrastructure metrics that occur within a time window around an abnormality of the service metric, and determining logic 414 configured to determine a set of candidate infrastructure metrics for the service metric based on how many times an abnormality of an infrastructure metric occurred within a time window around an abnormality of the service metric. The determining logic 414 is also configured to determine a degree of lag correlation (e.g., a correlation coefficient) for each candidate infrastructure metric with respect to the service metric. Service performance management system 130 also includes selecting logic 416 configured to select one or more candidate infrastructure metrics having a degree of lag correlation that exceeds a threshold to be a leading indicator infrastructure metric for the service metric, and warning providing logic 418 configured to provide a performance degradation warning for the service when an abnormality of one of the leading indicator infrastructure metrics is detected.

Figure 5:
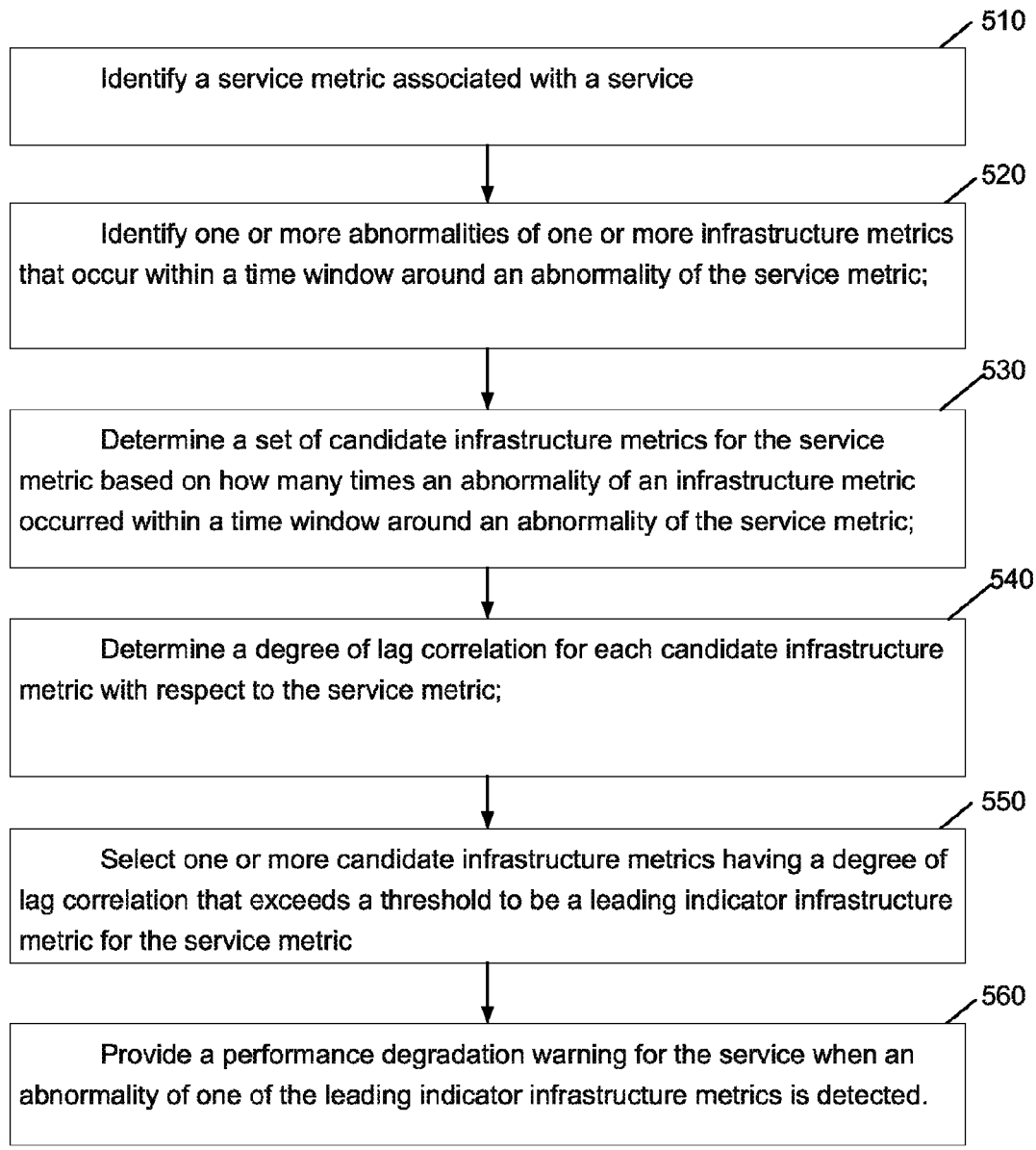
FIG. 5 is a flow chart illustrating operation of a service performance management system 130 according to an example implementation.

FIG. 5 is a flow chart illustrating operation of a service performance management system 130 according to an example implementation. At 510, a service metric associated with a service is identified. At 520, one or more abnormalities of one or more infrastructure metrics are identified that occur within a time window around an abnormality of the service metric. At 530, a set of candidate infrastructure metrics for the service metric are identified based on how many times an abnormality of an infrastructure metric occurred within a time window around an abnormality of the service metric. At 540, a degree of lag correlation is determined for each candidate infrastructure metric with respect to the service metric. This may include determining a Pearson correlation coefficient for the infrastructure metric with respect to the service metric, for example. At 550, one or more candidate infrastructure metrics that have a degree of lag correlation that exceeds a threshold are selected to be a leading indicator infrastructure metric for the service metric. For example, one or more candidate infrastructure metrics that have a correlation coefficient that exceeds a threshold, e.g., a correlation coefficient greater than 0.6, may be selected to be leading indicators for the service/service metric. At 560, a performance degradation warning for the service is provided when an abnormality of one of the leading indicator infrastructure metrics is detected.

Figure 6:
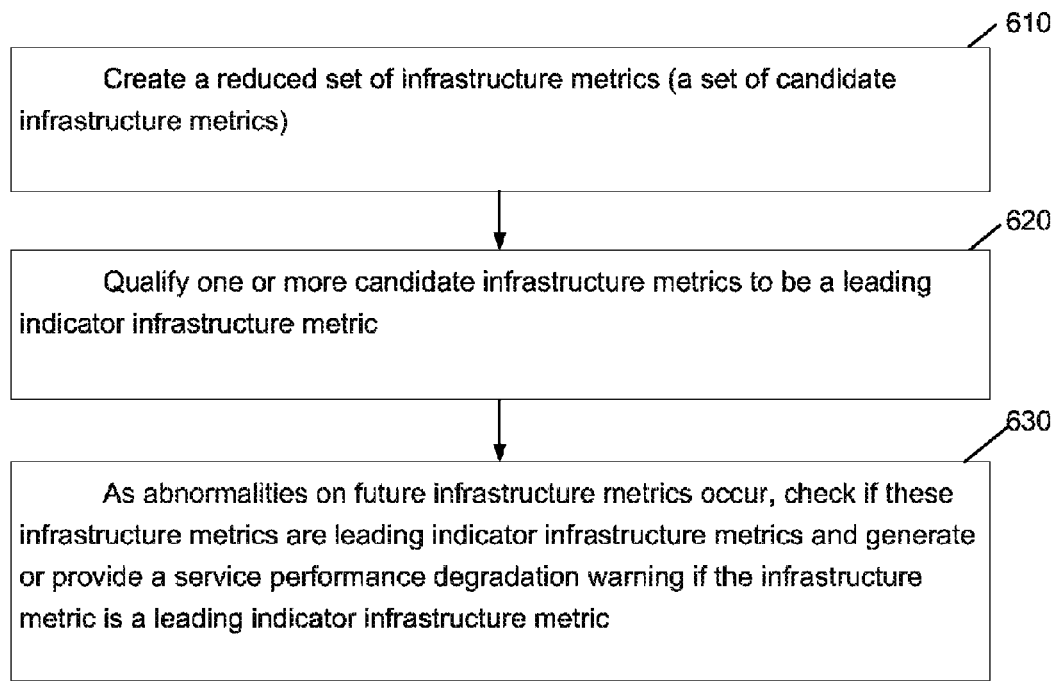
FIG. 6 is a flowchart illustrating operation of a service performance management system according to an example implementation.

FIG. 6 is a flowchart illustrating operation of a service performance management system according to an example implementation. At 610, a reduced set of infrastructure metrics is created, which may be referred to as a set of candidate infrastructure metrics. At 620, one or more of the candidate infrastructure metrics are evaluated and qualified to be a leading indicator infrastructure metric. At 630, as abnormalities on future infrastructure metrics occur, it is checked if these infrastructure metrics are leading indicator infrastructure metrics. If the abnormality is for an leading indicator infrastructure metric, a service performance degradation warning is provided or sent to warn of a pending performance degradation of the service.

Figure 7:
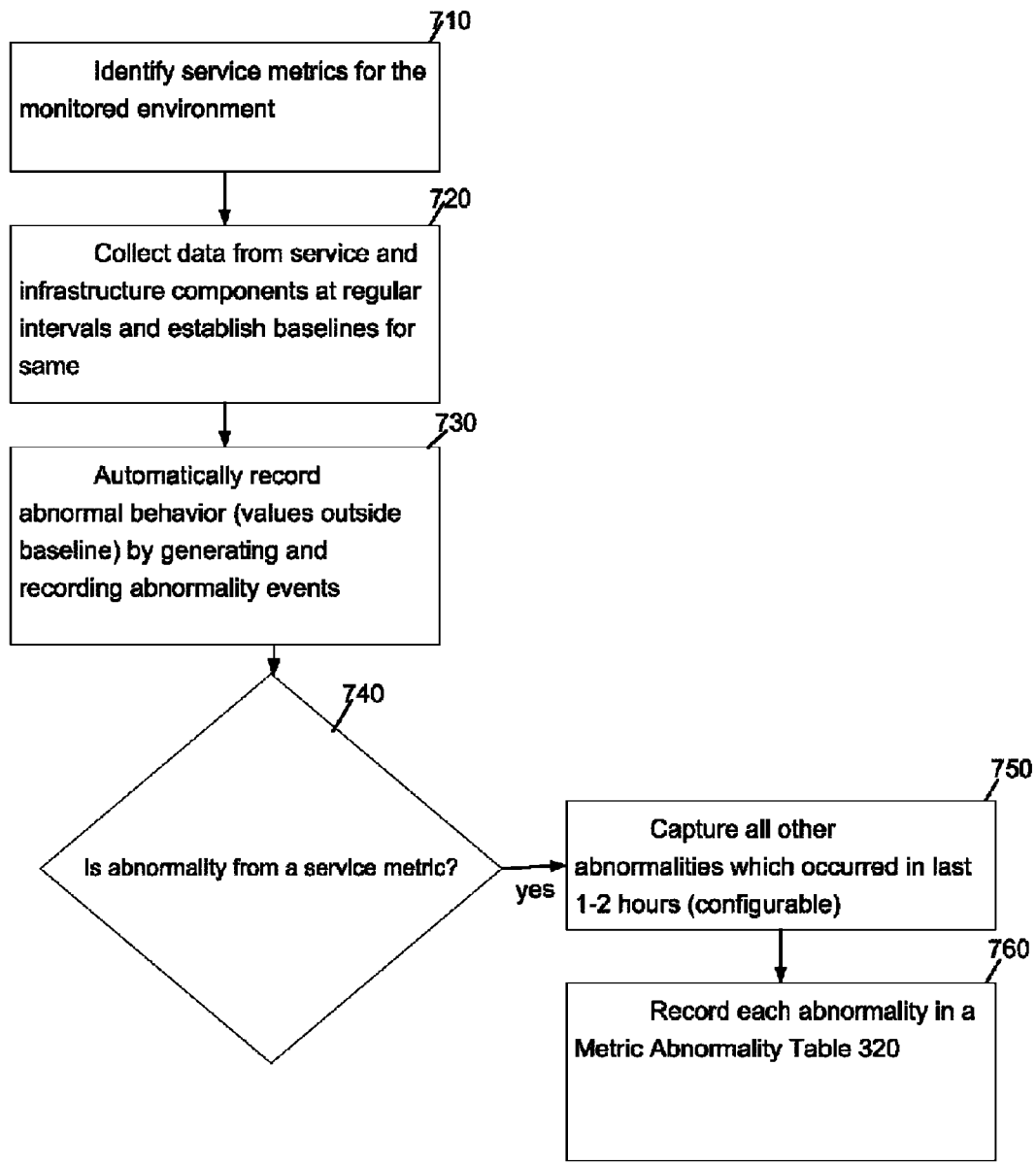
FIG. 7 is a flowchart illustrating some example details of operation 610 of FIG. 6 according to an example implementation.

FIG. 7 is a flowchart illustrating some example details of operation 610 of FIG. 6 according to an example implementation. Creating a reduced set of infrastructure metrics, which may also be referred to as a set of candidate infrastructure metrics, may involve use of baselines and the ability to automatically detect abnormal values from the established baseline pattern. In an example implementation, when and only when a candidate infrastructure metric exhibits abnormal behavior, other abnormalities that occurred within a window of time (e.g., one or two hours) either around or before the candidate infrastructure metric abnormality should be automatically collected or captured.

Referring to FIG. 7, at 710, one or more service metrics are identified for a monitored environment. At 720, data (metric values) are collected from service and infrastructure components at regular intervals (service metrics and infrastructure metrics) and baselines are established for each infrastructure metric and service metric. At 730, abnormal behavior (metric values outside their baseline) are automatically recorded. At 740, it is determined whether an abnormality is from a service metric. The flow proceeds to operation 750 if the abnormality is from a service metric. At 750, all other abnormalities (abnormal metric values) are captured which occurred in the last 1 to 2 hours, or during other configurable time period or window, around or before the occurrence of the service metric abnormality. The actual metric values may be recorded along with a timestamp that indicates the time the metric value occurred or was collected, so that old entries may be phased out of (or dropped from) the table. Each abnormality, such as each infrastructure metric abnormality and service metric abnormality, may be recorded, such as recorded or stored in a metric abnormality table 320. From this table 320 or list of abnormalities, system 130 may determine a reasonable number of infrastructure metrics to track and on which to perform data correlation, without a major impact to the system being monitored since this is a reduced set of metrics for correlation and comparison. Data or abnormality events recorded in the abnormality table 320 may be kept up-to-date by re-updating the data when new abnormality events occur. The size of the table 320 may be limited by expiring entries having an older timestamp or which have not repeated in a last N service degradations.

Figure 8:
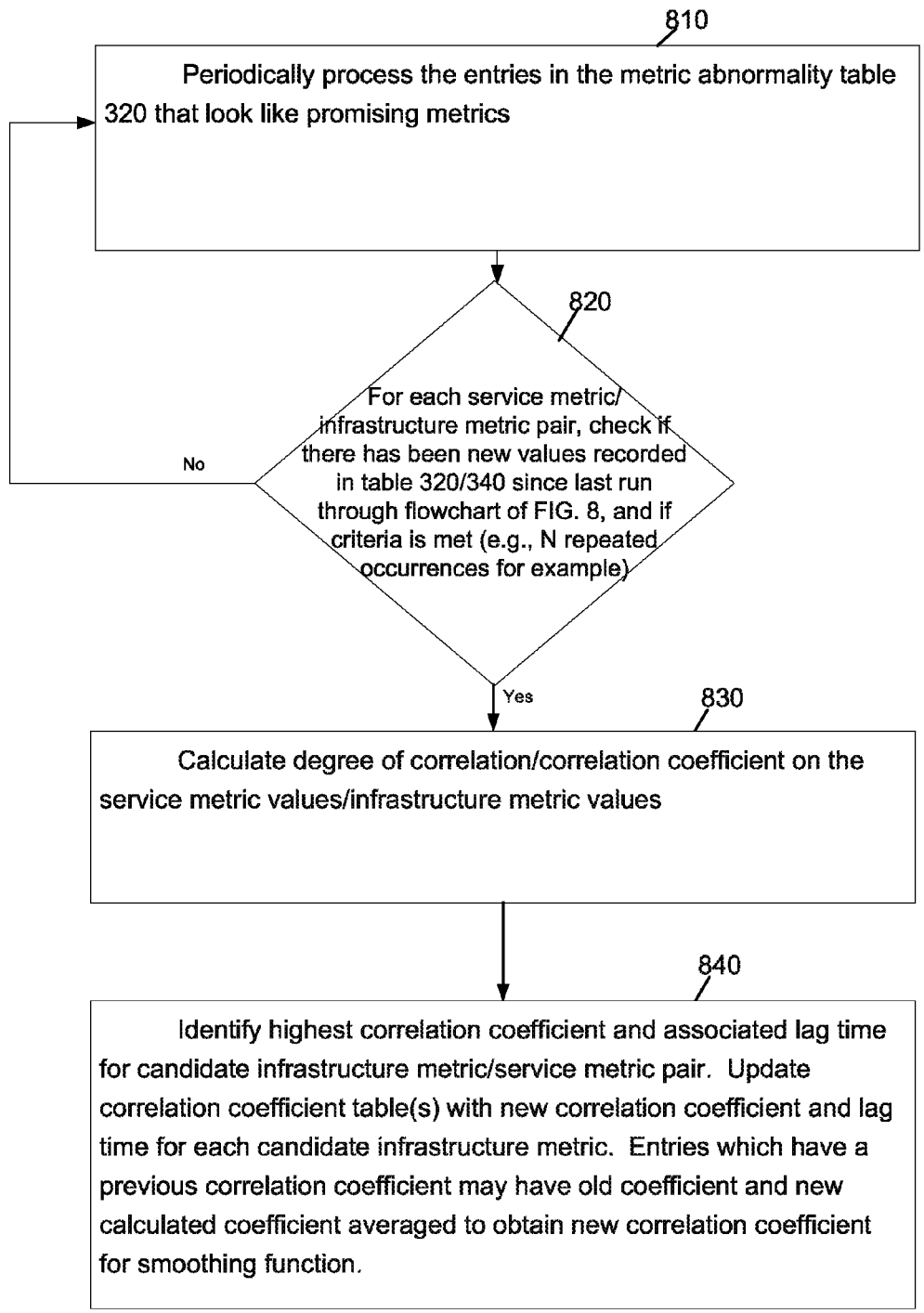
FIG. 8 is a flow chart illustrating some example details of operation 620 according to an example implementation.

FIG. 8 is a flow chart illustrating some example details of operation 620 according to an example implementation. At 810, the entries (abnormality data/values) in metric abnormality table 320 are periodically processed. At 820, for each service metric/infrastructure metric pair, system 130 checks if there has been new values recorded in table 320 since a last processing of the data in table 320. If a minimum criteria is met, e.g., when an infrastructure metric abnormality has a history of repeating, flow proceeds to operation 830.

At operation 830, a degree of correlation (e.g., a Pearson correlation coefficient) is calculated by system 130 for the infrastructure with respect to the service metric. In an example implementation, at operation 830, a lag correlation may be calculated between the infrastructure metric and the service metric, by shifting in time the data/values of one of the metrics before doing the correlation or comparison. One simple example implementation is to perform data correlation first with a 15 minute lag on one of the sets of metric values, then with a 30 minute lag, then with a 45 minute lag, and so on up to 1 hour or other maximum time period. The correlation operation that yields the highest degree of correlation may be recorded (both the correlation coefficient and the lag time, for example). Metrics which do not exhibit a significant lag correlation within the maximum time may be discarded or ignored. In the future, an infrastructure metric (e.g., leading indicator infrastructure metric) having a significant correlation with the service metric may be used to provide a warning of a service performance degradation, e.g., where the warning is triggered when an abnormality occurs for the leading indicator infrastructure metric.

At 840, system 130 may identify a highest correlation coefficient and associated lag time for candidate infrastructure metric/service metric pair. Correlation coefficient table(s) are updated with a new correlation coefficient and lag time for each (or one or more) candidate infrastructure metric. Entries which have a previous correlation coefficient may have old coefficient and new calculated coefficient averaged to obtain new correlation coefficient for smoothing function.

With respect to the flow chart of FIG. 8, lag correlation may be performed on data during only a small configurable window of time, e.g., 1-2 hours before a detected abnormality event, or 3 hours before up to 3 hours after the abnormality event, or other time window. In some cases, performing correlation around an abnormality event (both preceding and after the abnormality event) may yield better results as part of data correlation since metrics may exhibit more variation both before an after an abnormality event, which can be used to improve correlation, at least in some cases.

Figure 9:
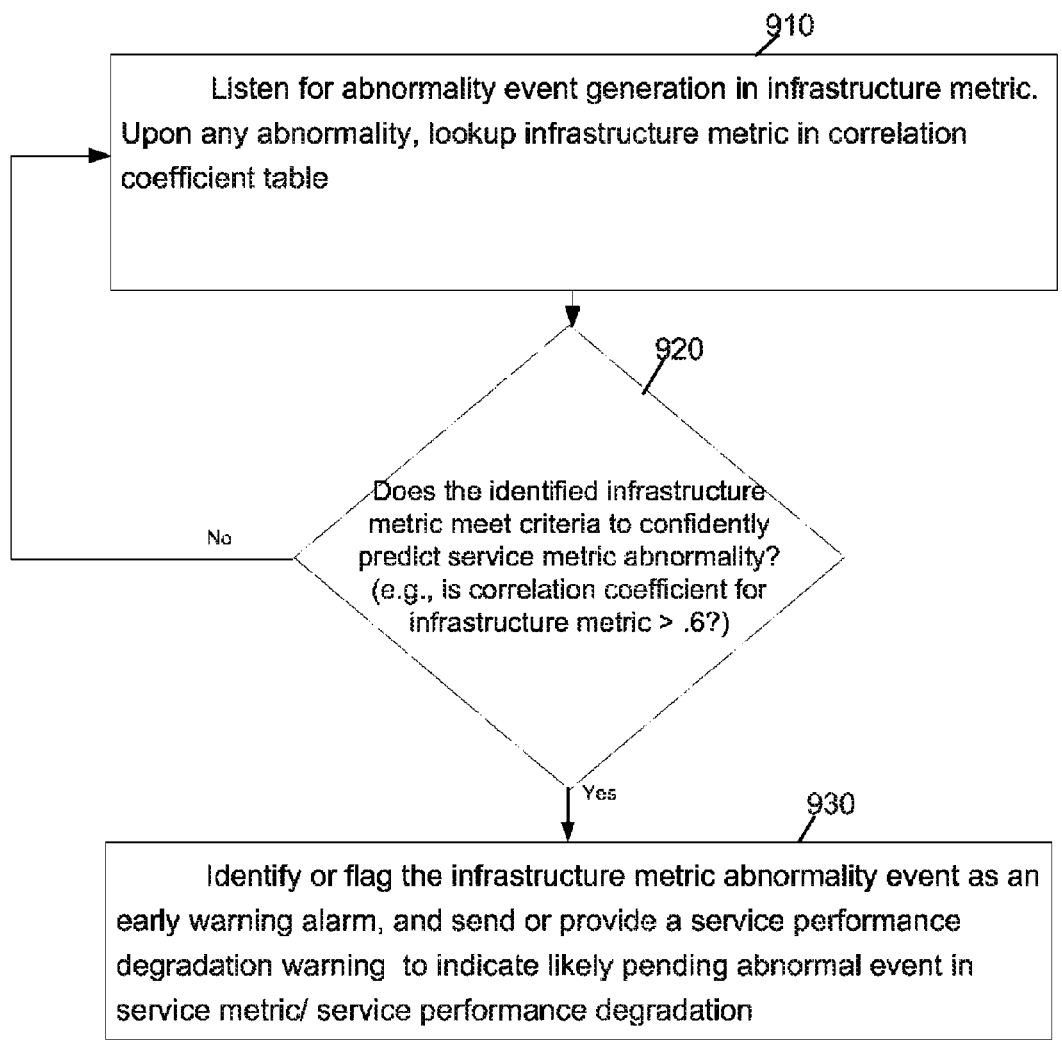
FIG. 9 is a flow chart illustrating some example details of operation 630 according to an example implementation.

FIG. 9 is a flow chart illustrating some example details of operation 630 according to an example implementation. At 910, system 130 may listen for abnormality event generation in an infrastructure metric. Upon any infrastructure abnormality, system 130 may lookup the infrastructure metric in a correlation coefficient table. At 920, system 130 may determine whether the identified infrastructure metric meets criteria to confidently predict a service abnormality, e.g., whether the correlation coefficient for the infrastructure metric exceeds 0.6 (for example, which indicates the metric is a leading indicator infrastructure metric). At 930, if the identified infrastructure metric meets criteria to confidently predict service metric abnormalities, then the system 130 may identify or flag the infrastructure metric abnormality event as an early warning alarm, and send or provide a service performance degradation warning to indicate a likely or pending abnormality event in the service metric (e.g., a warning of a likely service performance degradation).

Figure 10:
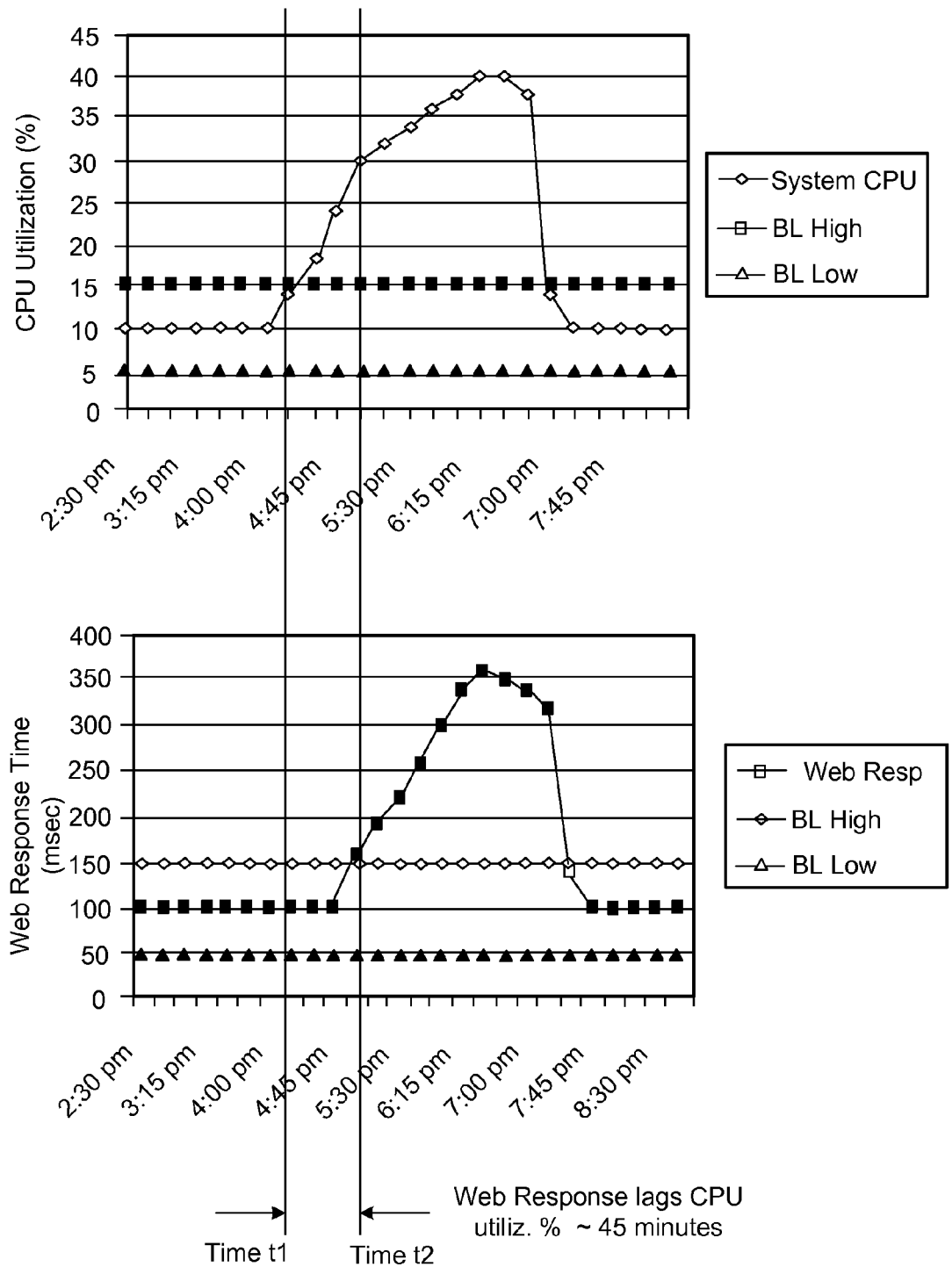
FIG. 10 is a diagram illustrating an example lag time for an example service metric with respect to an infrastructure metric.

FIG. 10 is a diagram illustrating an example lag time for an example service metric with respect to an infrastructure metric. As shown in FIG. 10, a graph is shown for CPU utilization % (an example infrastructure metric) and a graph is shown for a web response time (an example service metric). At approximately time t1, the CPU utilization % metric is equal to a baseline high (BL high, or baseline upper value), and continues increasing until it reaches a value of approximately 40%. Similarly, at time t2, which is approximately 45 minutes after t1, the web response time meets or crosses the baseline high (or upper baseline value) and continues until the response time slightly exceeds 350 msec. The two graphs shown in FIG. 10 may be used to show at least some degree of correlation between the CPU utilization % and the response time, with about a 45 minute lag time between these metrics.

Figure 11:
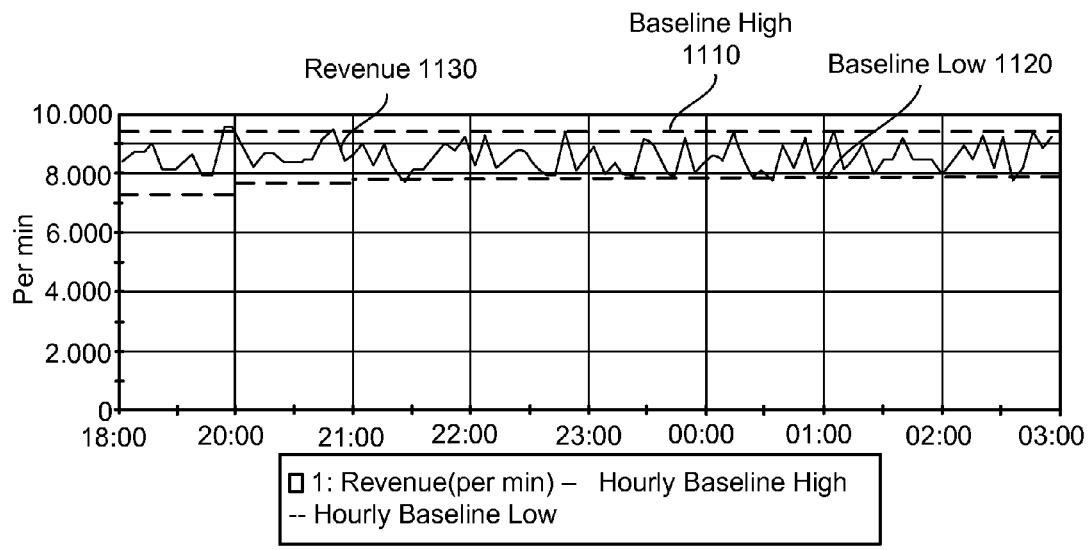
FIG. 11 is a diagram illustrating a metric 1130 and a baseline for such metric.

FIG. 11 is a diagram illustrating a metric 1130 (revenue per minute, which may be considered an example service metric), and a baseline for such metric (including a baseline high 1110 and a baseline low 1120). As can be seen, the baseline low 1120 and baseline high 1110 change every hour, based on collected metric values for such hour.

Figure 12:
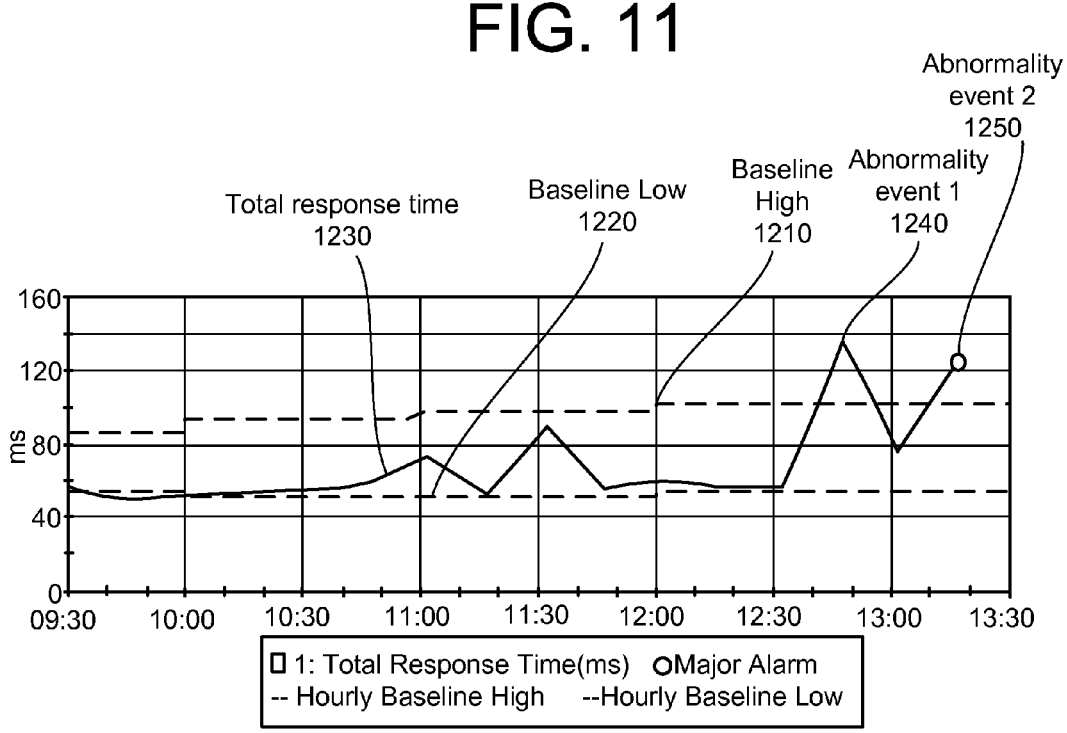
FIG. 12 is a diagram illustrating a metric that exceeds a baseline to generate an abnormality event according to an example implementation.

FIG. 12 is a diagram illustrating a metric that exceeds a baseline to generate an abnormality event according to an example implementation. A metric, such as a measured total response time 1230 is shown, along with a baseline for such metric, including a baseline low 1220 and a baseline high 1210. A first abnormality event occurs at abnormality event 1 (1240), and a second abnormality event for this metric occurs at abnormality event 2 (1250). If this event were a leading indicator infrastructure metric, then an alarm or warning (e.g., a service performance degradation warning) may be generated to indicate a pending or likely performance degradation of a service. If this metric is a service metric, then abnormality detected in a leading indicator (which met the criteria to confidently predict abnormalities of the service metric) may be used to provide a warning of such likely or pending abnormality events 1240 or 1250.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and including executable code that, when executed, is configured to cause at least one data processing apparatus to:
   identify a service metric associated with a service;
   identify one or more abnormalities of one or more infrastructure metrics that occur within a time window around an abnormality of the service metric;
   determine a set of candidate infrastructure metrics for the service metric based on how many times an abnormality of an infrastructure metric occurred within a time window around an abnormality of the service metric;
   determine a degree of lag correlation for each candidate infrastructure metric with respect to the service metric, by:
      collecting a set of data points for each candidate infrastructure metric,
      collecting a set of data points for the service metric, and
      determining a degree of correlation by calculating a Pearson's correlation coefficient for the candidate infrastructure metric with respect to the service metric based on the collected sets of data points;
   select one or more candidate infrastructure metrics having a degree of lag correlation that exceeds a threshold to be a leading indicator infrastructure metric for the service metric; and automatically provide a performance degradation warning for the service when an abnormality of one of the leading indicator infrastructure metrics is detected.

2. The computer program product of claim 1 wherein the code configured to cause at least one data processing apparatus to identify one or more abnormalities of one or more infrastructure metrics that occur within a time window around an abnormality of the service metric comprises code that is configurable to cause at least one data processing apparatus to:
- identify an abnormality of the service metric; and
- identify one or more abnormalities of one or more infrastructure metrics within a time window before and after the service metric abnormality.

3. The computer program product of claim 1 wherein the code configured to cause at least one data processing apparatus to identify one or more abnormalities of one or more infrastructure metrics that occur within a time window around an abnormality of the service metric comprises code that is configurable to cause at least one data processing apparatus to:
- identify an abnormality of the service metric; and
- identify one or more abnormalities of one or more infrastructure metrics within a time window preceding the service metric abnormality.

4. The computer program product of claim 3 wherein the code configured to cause at least one data processing apparatus to identify an abnormality of the service metric comprises the code configured to cause at least one data processing apparatus to:
- collect data points for the service metric;
- determine a baseline for the service metric based on the collected data points, the baseline including a high value and a low value;
- identify an abnormality of the service metric by identifying any data points of the service metric that are outside of the baseline.

5. The computer program product of claim 3 wherein the code configured to cause at least one data processing apparatus to identify one or more abnormalities of one or more infrastructure metrics within a time window preceding the service metric abnormality comprises code configured to:
- collect data points for one or more infrastructure metrics;
- determine a baseline for each of the infrastructure metrics based on the collected data points, each baseline including a high value and a low value;
- identify an abnormality of each of the infrastructure metrics by identifying any data points of the infrastructure metrics that are outside of the baseline for the infrastructure metric.

6. The computer program product of claim 1 wherein the code configured to cause at least one data processing apparatus to determine a set of candidate infrastructure metrics for the service metric comprises the code configured to cause at least one data processing apparatus to:
- determine, for each of a plurality of infrastructure metrics, a number of times that an abnormality of an infrastructure metric occurred during a time window before an abnormality of the service metric; and
- determine a set of candidate infrastructure metrics to include those infrastructure metrics that had the highest number of abnormalities within a time window before one or more service metric abnormalities as measured over a time period.

7. The computer program product of claim 1 wherein the code configured to cause at least one data processing apparatus to determine a degree of lag correlation by calculating a Pearson' correlation coefficient comprises code configured to:
- calculate at least a first Pearson's correlation coefficient based on the sets of data points wherein one of the sets of data points is lagged by a first lag amount and a second Pearson's correlation coefficient based on the sets of data points wherein one of the sets of data points is lagged by a second lag amount; and
- select either the first Pearson's correlation coefficient or the second Pearson's correlation coefficient, whichever is higher, as the degree of correlation for the candidate infrastructure metric.

8. The computer program product of claim 1 wherein the code configured to cause at least one data processing apparatus to determine a degree of lag correlation for a candidate infrastructure metric with respect to the service metric comprises code configured to:
- collect a set of data points for a candidate infrastructure metric;
- collect a set of data points for the service metric;
- determine a degree of correlation for the candidate infrastructure metric by calculating a Pearson's correlation coefficient for the candidate infrastructure metric with respect to the service metric based on the collected data points for the service metric and a lagged set of data points for the candidate infrastructure metric.

9. The computer program product of claim 1 wherein the code configured to cause at least one data processing apparatus to determine a degree of lag correlation for a candidate infrastructure metric with respect to the service metric comprises code configured to:
- collect a set of data points for a candidate infrastructure metric;
- collect a set of data points for the service metric;
- determine a degree of correlation for the candidate infrastructure metric by calculating a Pearson's correlation coefficient for the candidate infrastructure metric with respect to the service metric based on the collected data points for the candidate infrastructure metric and a lagged set of data points for the service metric.

10. The computer program product of claim 1 wherein the code configured to cause at least one data processing apparatus to provide a performance degradation warning comprises code configured to cause a data processing apparatus to:
- detect an abnormality of one of the candidate infrastructure metrics;
- provide a performance degradation warning for the service based on the detection of the abnormality of one of the candidate infrastructure metrics.

11. The computer program product of claim 1 wherein the code configured to cause at least one data processing apparatus to provide a performance degradation warning comprises code configured to cause a data processing apparatus to provide a performance degradation warning for the service based on the detection of the abnormality of one of the candidate infrastructure metrics, the performance degradation warning identifying the infrastructure metric, an abnormality that occurred for a triggering infrastructure metric that triggered providing the performance degradation warning for the service, and a lag amount that identifies the lag amount associated with the highest correlation coefficient for the triggering candidate infrastructure metric.

12. A computer implemented method comprising:
  identifying a service metric associated with a service;
  identifying one or more abnormalities of one or more infrastructure metrics that occur within a time window around an abnormality of the service metric;
  determining a set of candidate infrastructure metrics for the service metric based on how many times an abnormality of an infrastructure metric occurred within a time window around an abnormality of the service metric;
  determining a degree of lag correlation for each candidate infrastructure metric with respect to the service metric by:
    collecting a set of data points for each candidate infrastructure metric;
    collecting a set of data points for the service metric; and
    determining a degree of correlation by calculating a Pearson's correlation coefficient for the candidate infrastructure metric with respect to the service metric based on the collected sets of data points, wherein one of the sets of data are lagged by a lag amount;
  selecting one or more candidate infrastructure metrics having a degree of lag correlation that exceeds a threshold to be a leading indicator infrastructure metric for the service metric; and
  automatically providing a performance degradation warning for the service when an abnormality of one of the leading indicator infrastructure metrics is detected.

13. The computer implemented method of claim 12 wherein the identifying one or more abnormalities of one or more infrastructure metrics that occur within a time window around an abnormality of the service metric comprises:
  identifying an abnormality of the service metric; and
  identifying one or more abnormalities of one or more infrastructure metrics within a time window before the service metric abnormality.

14. The computer implemented method of claim 13 wherein the identifying an abnormality of the service metric comprises:
  collecting data points for the service metric;
  determining a baseline for the service metric based on the collected data points;
  identifying an abnormality of the service metric by identifying any data points of the service metric that are outside of the baseline.

15. The computer implemented method of claim 13 wherein the identifying one or more abnormalities of one or more infrastructure metrics within a time window preceding the service metric abnormality comprises:
  collecting data points for one or more infrastructure metrics;
  determining a baseline for each of the infrastructure metrics based on the collected data points; and
  identifying an abnormality of each of the infrastructure metrics by identifying any data points of the infrastructure metrics that are outside of the baseline for the infrastructure metric.

16. The computer implemented method of claim 12 wherein the providing a performance degradation warning comprises:
  detecting an abnormality of one of the candidate infrastructure metrics;
  providing a performance degradation warning for the service based on the detection of the abnormality of one of the candidate infrastructure metrics.

17. An apparatus comprising:
  a processor executing:
  service metric identification logic configured to identify a service metric associated with a service;
  abnormality identification logic configured to identify one or more abnormalities of one or more infrastructure metrics that occur within a time window around an abnormality of the service metric;
  determining logic configured to determine a set of candidate infrastructure metrics for the service metric based on how many times an abnormality of an infrastructure metric occurred within a time window around an abnormality of the service metric;
  the determining logic configured to determine a degree of lag correlation for each candidate infrastructure metric with respect to the service metric by:
    collecting a set of data points for each candidate infrastructure metric;
    collecting a set of data points for the service metric; and
    determining a degree of correlation by calculating a Pearson's correlation coefficient for the candidate infrastructure metric with respect to the service metric based on the collected sets of data points, wherein one of the sets of data points is lagged by a lag amount;
  selecting logic configured to select one or more candidate infrastructure metrics having a degree of lag correlation that exceeds a threshold to be a leading indicator infrastructure metric for the service metric; and
  warning providing logic configured to automatically provide a performance degradation warning for the service when an abnormality of one of the leading indicator infrastructure metrics is detected.

* * * * *